US010082178B2

(12) United States Patent
Dop et al.

(10) Patent No.: US 10,082,178 B2
(45) Date of Patent: Sep. 25, 2018

(54) ROLLER WITH INTEGRATED LOAD CELL

(71) Applicant: Aktiebolaget SKF, Gothenburg (SE)

(72) Inventors: Gerrit-Jan Dop, Alphen aan den Rijn (NL); Hendrik Anne Mol, Sleeuwijk (NL); Jeroen van Diermen, GW Lent (NL)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/634,144

(22) Filed: Jun. 27, 2017

(65) Prior Publication Data

US 2018/0003227 A1   Jan. 4, 2018

(30) Foreign Application Priority Data

Jun. 29, 2016 (DE) .......................... 10 2016 211 779

(51) Int. Cl.
| | |
|---|---|
| *F16C 33/34* | (2006.01) |
| *F16C 19/36* | (2006.01) |
| *F16C 41/00* | (2006.01) |
| *G01L 5/00* | (2006.01) |
| *G01M 5/00* | (2006.01) |

(52) U.S. Cl.
CPC ............ *F16C 33/34* (2013.01); *F16C 19/361* (2013.01); *F16C 41/002* (2013.01); *G01L 5/0019* (2013.01); *G01L 5/0028* (2013.01); *G01M 5/0041* (2013.01); *F16C 2233/00* (2013.01); *F16C 2240/12* (2013.01)

(58) Field of Classification Search
CPC ...... F16C 19/361; F16C 33/34; F16C 33/368; F16C 2240/12; F16C 2233/00; G10M 13/04; G10M 5/0041; G01G 11/02; G01L 5/045; G01L 5/0019; G01L 5/0028; G01B 7/16; B65G 39/02
USPC .............. 384/448, 456, 548, 558; 73/862.42, 73/862.451, 862.621, 862.627
See application file for complete search history.

(56) References Cited

U.S. PATENT DOCUMENTS

| | | | | | |
|---|---|---|---|---|---|
| 4,784,004 | A | * | 11/1988 | Ekola | ......................... G01L 5/10 73/862.474 |
| 5,111,585 | A | * | 5/1992 | Kawashima | ........... G01B 7/315 33/203.12 |
| 5,591,921 | A | * | 1/1997 | Schaede | .................. B41F 33/00 73/849 |

(Continued)

FOREIGN PATENT DOCUMENTS

| | | | | | |
|---|---|---|---|---|---|
| GB | | 2128345 A | * | 4/1984 | ............. G01G 11/04 |
| JP | | 2007283524 A | * | 11/2007 | |

(Continued)

*Primary Examiner* — Marcus Charles
(74) *Attorney, Agent, or Firm* — Bryan Peckjian; SKF USA Inc. Patent Dept.

(57) ABSTRACT

A roller of a roller bearing providing a hollow bore in which a load cell is arranged, for measuring a radial load acting on the roller. The load cell is mounted to the roller bore in a non-fixed manner and includes one or more cantilever beams that extend in an axial direction of the roller. A contact element is provided on each cantilever beam. Each element further bears against a surface of the roller bore. At least one sensor is provided on each cantilever beam for measuring bending thereof, due to deflection of the beam in a radial direction perpendicular to the axial direction.

13 Claims, 6 Drawing Sheets

(56) References Cited

U.S. PATENT DOCUMENTS

| | | | |
|---|---|---|---|
| 7,196,277 B1 * | 3/2007 | Santi | G01G 19/08 |
| | | | 177/136 |
| 7,698,963 B2 * | 4/2010 | Herhaus | G01L 1/2243 |
| | | | 177/211 |
| 2008/0115590 A1 * | 5/2008 | Loenner | G01L 5/0019 |
| | | | 73/862.42 |
| 2011/0155539 A1 * | 6/2011 | Schmidt | B65G 13/06 |
| | | | 198/608 |
| 2013/0048443 A1 * | 2/2013 | Muramatsu | F16D 65/18 |
| | | | 188/72.1 |
| 2014/0353127 A1 * | 12/2014 | Hearn | G01G 11/003 |
| | | | 198/810.01 |
| 2018/0003492 A1 * | 1/2018 | van der Ham | G01B 21/32 |

FOREIGN PATENT DOCUMENTS

| | | | | |
|---|---|---|---|---|
| KR | 20030086943 A | * | 11/2003 | |
| WO | WO-2011111550 A1 | * | 9/2011 | G01L 3/1478 |
| WO | WO-2015032445 A1 | * | 3/2015 | G01M 13/04 |
| WO | WO-2015032449 A1 | * | 3/2015 | F16C 41/004 |

* cited by examiner

ROLLER WITH INTEGRATED LOAD CELL

CROSS REFERENCE TO RELATED APPLICATIONS

This application claims priority to German patent application no. 102016211779.3 filed on Jun. 29, 2016, the contents of which are fully incorporated herein by reference.

FIELD OF THE INVENTION

The present invention relates to the field of load detection in roller bearings and is more particularly directed to a bearing roller with a hollow bore in which a load cell is arranged.

BACKGROUND OF THE INVENTION

An example of a bearing roller of this kind is known from WO 2016/016054. A device for detecting a radial load acting on the roller is disclosed. The device comprises a load cell that spans the roller bore diameter and is in fixed contact with diametrically opposite portions of the bore surface. When the roller is radially loaded, the circular cross section of the hollow bore is deformed to an elliptical shape. Under load, the load plane remains the same, but the contact locations of the load cell rotate within this plane during rotation of the roller. As a result, the contact locations not only experience radial displacement relative to each other, but also a transverse displacement. This effect is sometimes referred to as a chewing effect.

The load cell comprises a bending beam and a hinge arrangement and is designed such that the contact locations move with the bore surfaces, via elastic deformation of the load cell, to take up the motion associated with the chewing effect. More specifically, the load cell is designed such that the radial component of the relative displacement is decoupled from the transverse component, and bending of the beam due to the radial displacement is measured in order to calculate the radial load. The bending beam extends in a radial plane of the roller bore.

There is still room for improvement.

BRIEF SUMMARY OF THE INVENTION

The present invention defines a roller of a roller bearing comprising a load cell arranged in a hollow bore of the roller. The load cell is arranged in a non-fixed manner and comprises one or more cantilever beams that extend in an axial direction of the roller. A contact element is provided on each cantilever beam, which contact element bears against a surface of the roller bore, and at least one sensor is provided on each cantilever beam for measuring bending thereof, due to deflection of the beam in a radial direction, perpendicular to the axial direction.

The load cell is thus of straightforward construction and is easy to mount in the roller bore. Suitably, the load cell forms part of a sensor unit that is inserted into the roller bore. In a preferred example, the roller bore has a cylindrical surface. It is also possible for the bore to be tapered in axial direction. The sensor unit comprises a housing, whose shape preferably corresponds to the shape of the bore. A rigid part of the load cell is attached to the housing, which further contains electronic components of the sensor unit and a power source. The housing is designed such that only the contact element of each of the one or more cantilever beams is in contact with the roller bore surface. Thus, deformation of the roller bore due to radial load acting on the roller causes a deflection of each beam in radial direction, whereby the bending of each beam can be measured in a straightforward way to characterize the radial load.

As will be understood, a more accurate characterization of the radial load can be achieved when the load cell comprises two or more cantilever beams. In one embodiment, the load cell comprises first and second cantilever beams having a free end and a fixed end, whereby the contact element of the first beam bears against the bore surface at a first location and the contact element of the second beam bears against the bore surface at a second location, diametrically opposite from the first location. In a preferred example, the first and second beams extend in axial direction, essentially parallel to a rotation axis of the roller. In an alternative example, the beam extension has a radial component and the beams extend towards the roller bore surface. In other embodiments, the loads cell comprises three, four or more cantilever beams which preferably bear against the bore surface at evenly distributed circumferential locations.

The cantilever beams may comprise a piezoelectric bending element for measuring the bending stresses. Preferably, each cantilever beam is instrumented with at least one strain gauge. In one example, strain gauges are attached to opposite sides of the beam that experience compression and tension under bending. In embodiments where the beam has a geometry that causes at least a portion of the beam to experience both tension and compression on one side of the beam, due to radial deflection, first and second axially spaced strain gauges may be attached to the beam portion. The strain gauges may be connected in half-bridge configuration. When the load cell comprises at least two cantilever beams, each of which is instrumented with two strain gauges, the four strain gauges are preferably connected in a full Wheatstone bridge configuration, to provide temperature compensation.

Because the load cell is not fixed to the roller bore, and the contact element of each beam only bears against the bore surface, it is possible for relative movement to take place. As a result, the load cell is not sensitive to the transverse motions and potential problems associated with the chewing effect.

Preferably, the contact surface of each contact element is convex in shape and is curved in circumferential direction and in axial direction of the roller. In a preferred example, the contact element has a domed shape, equivalent to a section sliced through a peripheral region of a sphere. Advantageously, the contact element may have a radius of curvature rc in circumferential direction and/or in axial direction that is equal to a radius rb of the roller bore. This maximises the surface area of the contact, thereby reducing the contact pressure on the bore surface. Preferably, rc= (0.8–1.0) rb.

In a further development of the invention, the geometry of each cantilever beam is adapted to minimize relative axial motion between the contact element and the bore surface due to deflections of the beam in radial direction. In a preferred example, each cantilever beam comprises a first section that extends in one axial direction and further comprises a second axial section that extends in opposite axial direction. The bending stiffnesses of the first and second sections are adapted to each other such that the combined deflection of the beam sections causes minimal axial motion at the contact element. Furthermore, when the contact element is curved in axial direction, the minimal axial motion due to beam deflection is translated into a tilting motion, such that the contact element rolls on the bore surface rather than slides. The friction associated with sliding contact in axial direction could cause reaction forces that interfere the pure bending stresses on the cantilever beams. Accuracy of the measured bending is thus improved.

In a preferred example of the further development, each cantilever beam has one first axial section and one second axial section which are joined by a single bend, such that the beam has a fish-hook shape. This is a straightforward geometry which is easy to manufacture. As will be understood other geometries are conceivable in which the beam comprises several sections whose axial direction changes relative to neighbouring sections, such that radial deflection of the beam causes minimal axial motion of the contact element relative to the bore surface.

Relative motion between the bore surface and contact elements is also possible in circumferential direction. However, as long as the relative rotation is significantly slower than the rotation of the roller, it has been found that the influence on the measured bending is negligible.

In one preferred embodiment, relative rotation is kept to a slow, "creeping" speed by means of a resilient mounting of the sensor unit to the roller bore. First and second elastomeric sealing elements may be provided at either axial end of the sensor unit, which seal a small radial gap between the housing and the surface of the roller bore. The friction between the sealing elements and the surfaces which they contact prevents significant relative rotation of the sensor unit and of the contact elements. The sealing elements also prevent the ingress of contaminants into the roller bore and take up deformations of the roller bore, to prevent the housing of the sensor unit from contacting the bore surface. In a preferred example, the elastomeric sealing elements are executed as O-rings.

The invention will now be described in further detail with reference to the accompanying drawings.

DETAILED DESCRIPTION OF THE INVENTION

Figure 1:
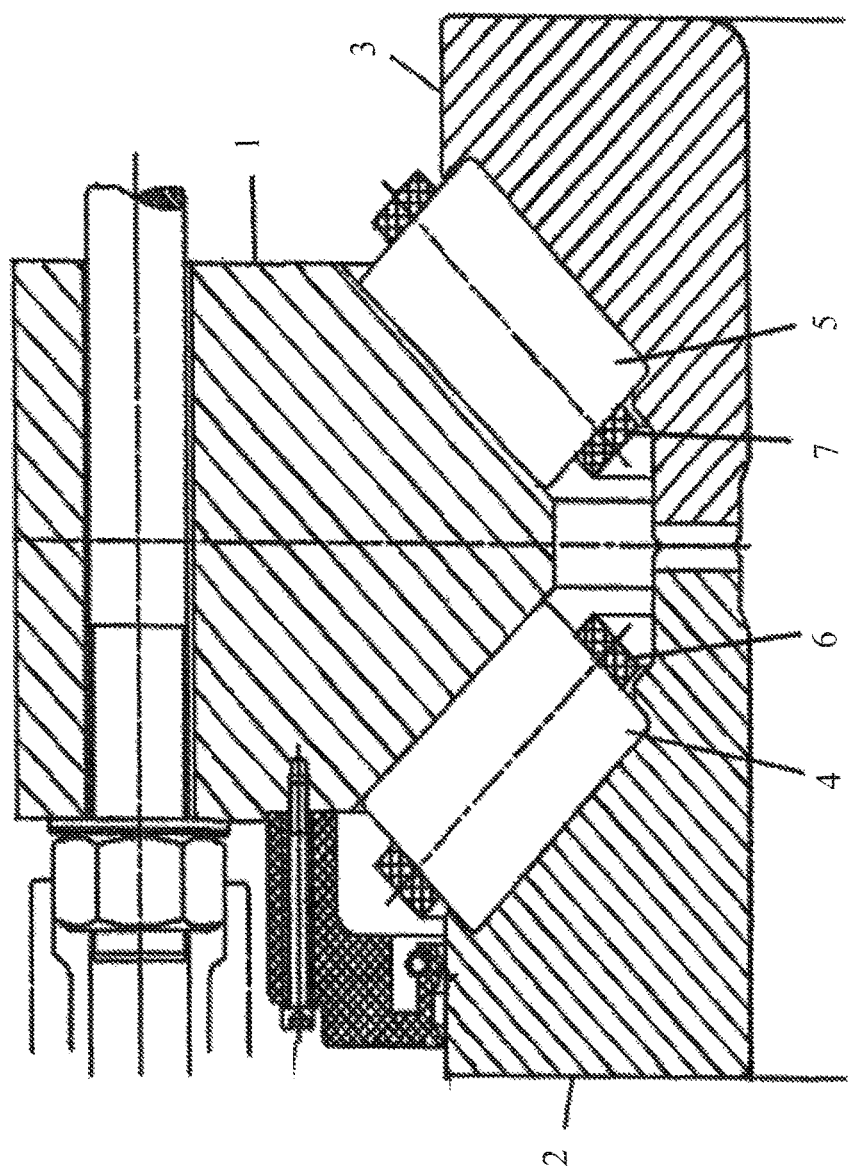
FIG. 1 shows a part cross-sectional view of a roller bearing that may be equipped with a roller according to the invention.

An example of a bearing that is suitable for supporting the main shaft of a wind turbine is shown in FIG. 1. The bearing must withstand high axial loads as well as radial loads and is executed as a double-row tapered roller bearing. The bearing comprises an outer ring 1 provided with conically shaped first and second outer raceways for a first set 4 and a second set 5 of tapered rollers. The bearing further comprises first and second inner rings 2, 3 which are respectively provided with conically shaped first and second inner raceways for the first and second roller sets 4, 5. In addition, a first cage 6 and a second cage 7 are provided for retaining the rollers of the first and second roller sets respectively. Typically, the cages are formed from segments that abut each other in circumferential direction.

To provide the necessary stiffness and ensure a long service life, the bearing is preloaded. The axial position of the inner rings 2, 3 relative to the outer ring 1 is set such that the first and second roller sets 4, 5 have a negative internal clearance. The first and second inner rings are then bolted together or otherwise axially clamped to maintain the preload over the lifetime of the bearing. In practice, however, preload gradually decreases over time. If preload is lost and the radial load on a roller becomes zero, it will be able to move towards a small-diameter side of the radial gap between the inner and outer raceways, possibly leading to an excessive load that will reduce the service life of the bearing. Since a main shaft bearing is a critical and expensive component of a wind turbine, it is important to detect if the bearing loses preload. It is also beneficial to be able to measure the radial load acting on the bearing and to characterize the angular extent of the bearing's loaded zone. One way of doing this is to measure the radial load acting on an individual roller. In the depicted bearing, at least one of the solid tapered rollers in either of the first and second roller sets 4, 5 is replaced with a sensorized roller according to the invention.

Figure 2:
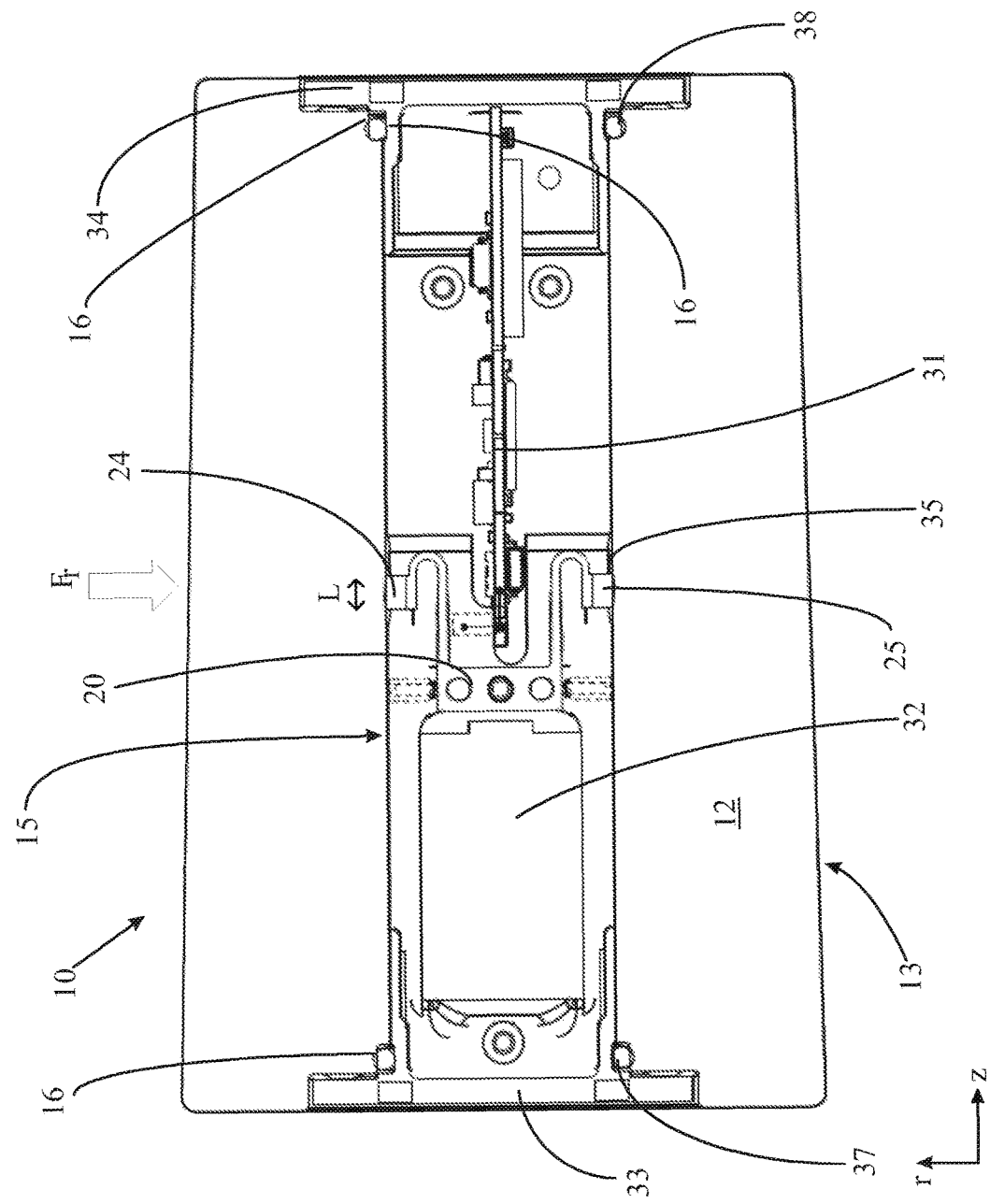
FIG. 2 shows a cross-section of an example of a roller according to the invention comprising a sensor unit mounted in a hollow bore of the roller.

A radial cross-section of an example of a sensorized roller according to the invention is shown in FIG. 2. The roller 10 has a roller body 12 whose radially outer surface 13 is in contact with the inner and outer raceways of the bearing. The roller is provided with a hollow bore, which has a cylindrical bore surface 15 in the depicted example. A sensor unit is accommodated in the bore, which is adapted for measuring the radial load on the roller 10. According to the invention, the sensor unit comprises a load cell 20 having a cantilever beam that extends in an axial direction z of the roller. The load cell is mounted in the bore in a non-fixed manner.

Figure 3:
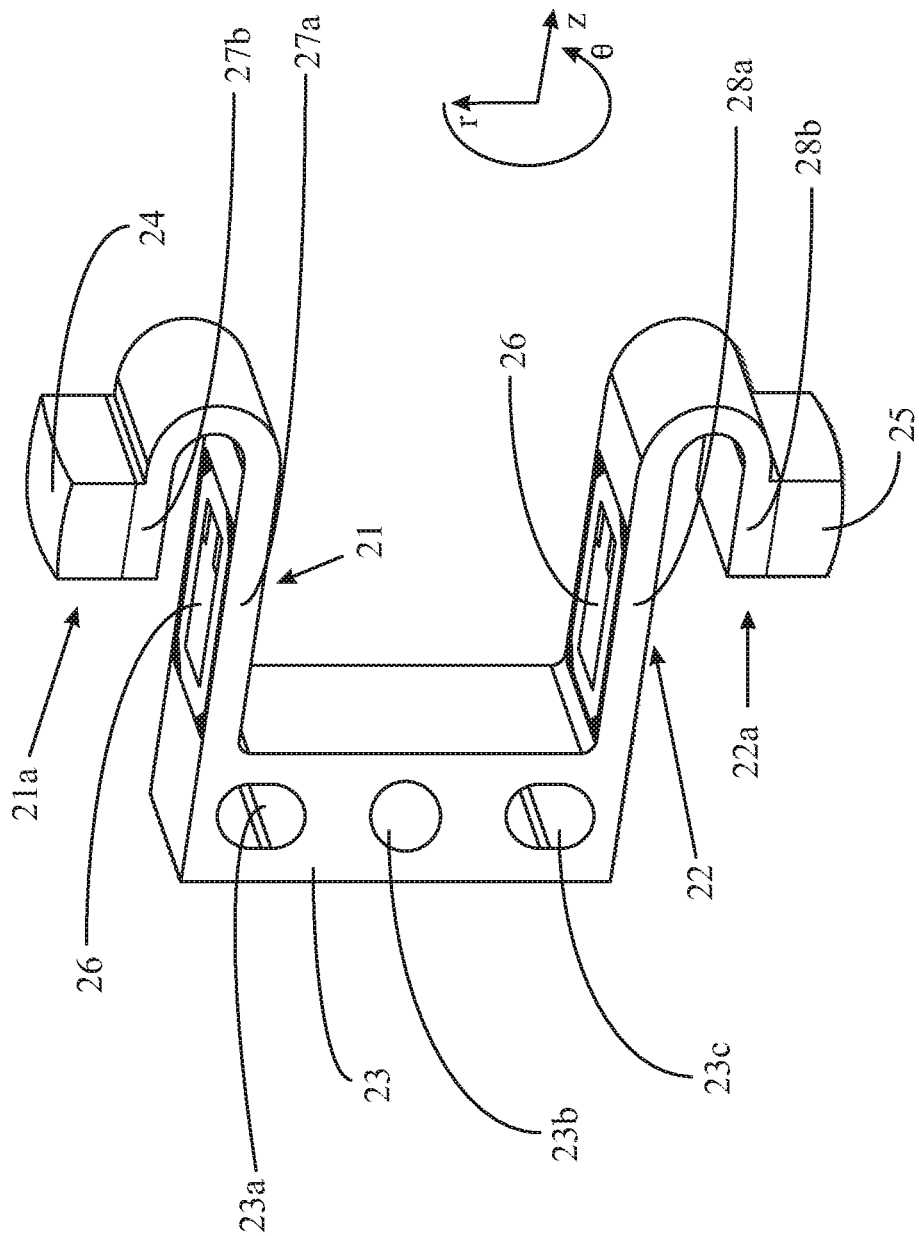
FIG. 3 shows a perspective view of a load cell used in the roller of FIG. 2 having a first arrangement of strain gauges.
Figure 4:
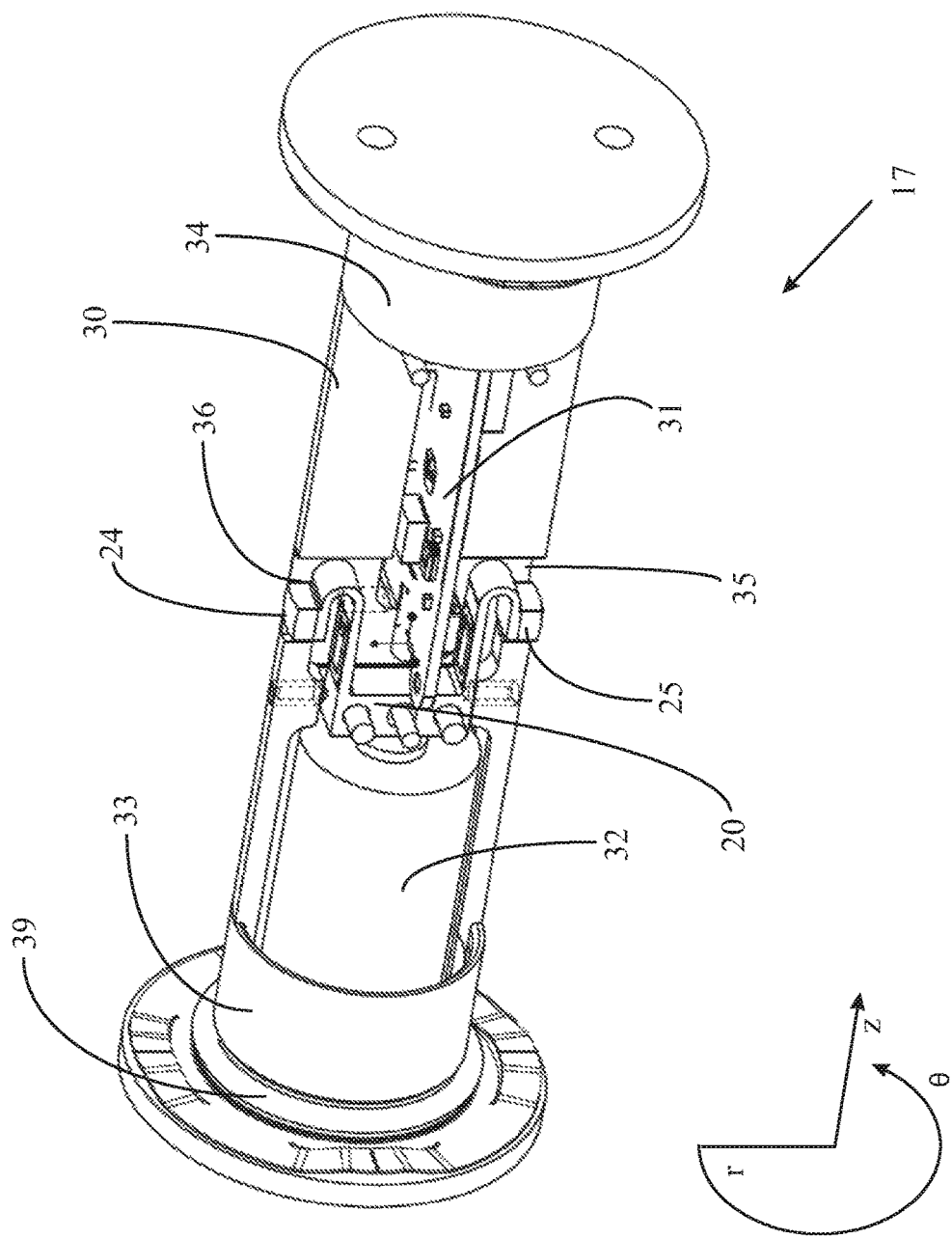
FIG. 4 shows a perspective view of the sensor unit used in the roller of FIG. 2, with part of a housing component removed.

The load cell 20 is shown in greater detail in FIG. 3 and has first and second cantilever beams 21, 22 which have respective free ends 21a, 22a and fixed ends that are connected to a rigid mounting portion 23. The mounting portion 23 serves to fix the load cell to a housing 30 of the sensor unit 17, which is depicted in more detail in FIG. 4.

The load cell further has a first contact element 24 provided at the free end 21a of the first cantilever beam and a second contact element 25 provided at the free end 22a of the second cantilever beam. The first contact element 24 bears against the bore surface 15 at a first location and the second contact element bears against the bore surface at a second location, diametrically opposite from the first location. Preferably, the contact elements 24, 25 have a relatively large surface area, to prevent excessive contact pressure on the roller bore surface 15. The contact elements may have a spherical or convex surface that is curved in circumferential direction θ, to conform with the cylindrical bore surface. Advantageously, the contact surface of the contact elements 24, 25 is also curved in axial direction z, which will be explained in more detail later. Suitably, the contact elements have a dome-shaped contact surface resembling a slice through a peripheral region of a sphere.

When a radial load Fr acts on the roller 10, the circular cross-section of the roller bore deforms to an elliptical shape, resulting in a change of bore diameter which in turn causes a deflection of the first and second cantilever beams 21, 22 in radial direction r. Thus, by measuring the bending of at least one of these beams, it is possible to detect variations in the radial load acting on the roller 10.

Figure 5:
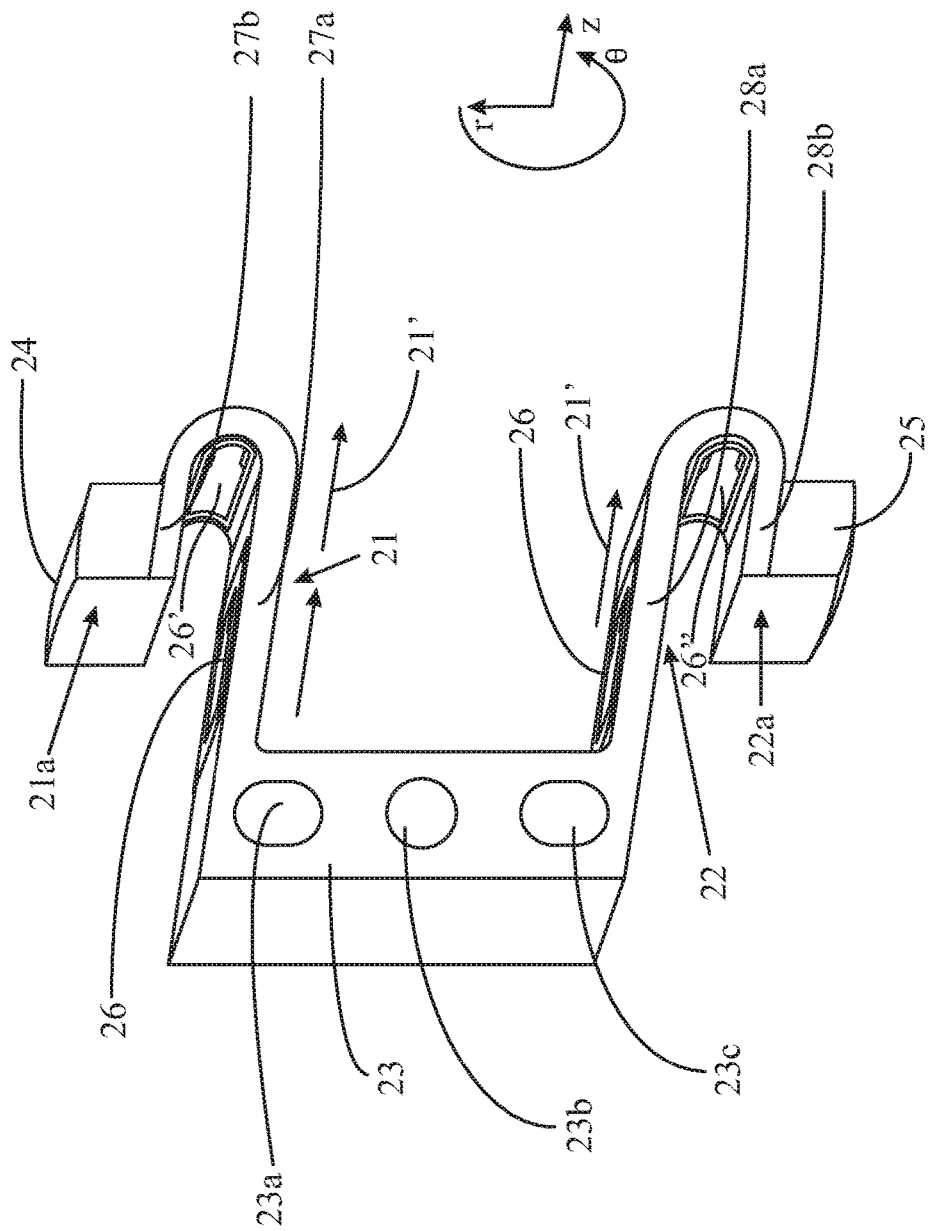
FIG. 5 shows a perspective view of a load cell used in the roller of FIG. 2 having an alternative arrangement of strain gauges.

Preferably, the bending of each beam is measured. As a result of the bending, one radially oriented surface of each beam is in tension while the other is in compression. In the depicted example, strain gauges are attached to the radially inner (strain gauge 26 on beam 21) and outer sides (strain gauge 26 on beam 22) of each beam 21, 22, as shown in FIG. 3. Alternatively, two axially spaced strain gauges (strain gauge 26 and strain gauge 26' on beam 21) may be attached on one side of the beam 21 in which both tension and compression is present, due to the beam geometry, as shown in FIG. 5. Strain gauge 26 and strain gauge 26' are axially spaced in a axial direction 21'.

As will be understood, the strain gauges on the beams may be connected in a Wheatstone bridge configuration, to compensate for temperature changes.

Suitably, the radial distance between the outer surfaces of the first and second contact elements 24, 25 is slightly larger than the diameter of the roller bore, prior to assembly, so that the first and second beams 21, 22 are mounted with a certain preload. The preload helps to create adequate Hertzian contact stiffness between contact elements 24 and 25 and the bore surface 15. The preload also prevents loss of contact when the radial distance between the contact elements changes depending on the orientation of the roller and the load cell relative to the load plane.

When, for example, the roller 10 and the load cell 20 are in a 12 o'clock or 6 o'clock position relative to the plane of the radial load Fr, the distance between the contact elements 24, 25 will reduce and the bending of both beams increases. If the roller and the load cell are in a 3 o'clock or 9 o'clock position relative to the radial load Fr then, due to the elliptical deformation, the distance between the contact elements 24, 25 will increase and the bending of both beams 21, 22 will decrease.

Thus, the deflection of the first and second beams 21, 22 varies over one revolution of the roller and will also change when the roller 10 either enters or exits the loaded zone of the bearing. When a beam bends, a tip of the beam will experience axial displacement relative to its undeformed position. In a sensorized roller according to the depicted example, the variation in beam deflection will cause axial displacement in z direction of the first and second contact elements 24, 25 relative to the bore surface 15. This has the potential to generate sliding frictional forces that introduce axial stresses in the beam, which influence the pure bending stresses. It is therefore advantageous to eliminate or minimize sliding between the contact elements 24, 25 and the bore surface 15.

In a further development of the invention, the one or more cantilever beams of the load cell are provided with a geometry that reduces the axial displacement of the contact element relative to the bore surface as a result of beam deflection in radial direction.

Specifically, the first cantilever beam 21 has a first section 27a that extends in axial direction away from the mounting portion 23 and a second section 27b that extends back towards the mounting portion in opposite axial direction, whereby the first contact element 24 is provided on the second section 27b. Similarly, the second cantilever beam 22 has a first section 28a that extends away from the mounting portion 23 and a second section 28b that extends back towards the mounting portion, whereby the second contact element 25 is provided on the second longitudinal section 28b. The respective first and second sections are joined by a bend, such the load cell has a fish-hook shape in the depicted example. Deflection of the second section 27b, 28b in radial direction interacts with the deflection of the respective first section 27a, 27b to reduce the axial displacement of the respective contact element 24, 25 relative to the bore surface 15. The stiffness of the second section 27b, 28b is suitably adjusted relative to the stiffness of the respective first section 27a, 28a to achieve this effect. Furthermore, due to the curvature of the surface of the contact elements 24, 25 in axial direction z, the axial displacement causes a rolling/tilting motion of the contact element on the bore surface. Thus sliding contact in axial direction z can be eliminated.

The sensor unit 17 is not fixed to the roller bore. It is therefore possible for relative rotation in circumferential direction θ to occur. Such a motion is referred to as creep, and is expected to be significantly slower than the rotational speed of the roller 10. As a result there will be a negligible effect on differential measurements of the radial distance between the contact elements 24, 25.

As mentioned, the load cell 20 is mounted to the sensor unit housing 30 via the mounting portion 23. In the example depicted in FIG. 3, the mounting portion has three fixing holes 23a, 23b, 23c. The upper and lower holes 23a, 23c are elliptical in shape, so as to enable adjustment of the radial position of the load cell relative to the housing 30. The central hole 23b serves to fix the load cell in position. In other examples, only one fixing hole is provided.

Suitably, the housing 30 is formed from two halves which are connected together after the various components of the sensor unit 17 are mounted to one housing half. The sensor unit is shown in perspective view in FIG. 4, with one half of the housing removed. The unit further comprises a PCB 31, which is equipped with a signal processor for processing the signals from the strain gauges 26 and with a transmitter for transmitting the processed signals. The unit further comprises a power source 32, which is a battery in the depicted example. In other examples, the sensor unit is provided with power harvesting means.

The housing halves may be connected together by means of a first cap 33 and a second end cap 34. In the depicted example, a threaded portion is provided on an outer surface of each housing half, at both axial ends of the housing 30, which match together to form an external thread. An internal thread is provided on the first end cap 33 and the second end cap 34 which are screwed onto the housing halves to join these together. Needless to say, other ways of joining may be applied.

When assembled, the portion of the housing 30 that is inserted into the roller bore has an outside diameter that is slightly smaller than the bore diameter. To enable the contact elements 24, 25 of the load cell to be in contact with the bore surface 15, the housing 30 comprises openings 35 through which the contact surface of the contact elements 24, 25 protrude. Thus, deformations of the roller bore are transferred to the load cell 20 and not to the housing 30 of the sensor unit 17. The housing may be made from a plastic material, and is sufficiently stiff in radial direction to ensure that the outer surface of the housing 30 does not come into contact with the bore surface 15 along its full length.

In the depicted example, the sensor unit 17 is resiliently mounted to the roller bore surface 15 by means of a first resilient O-ring 37 and a second resilient O-ring 38. At either axial end of the roller bore, the bore surface 15 comprises a stepped portion 16 (refer FIG. 2), such that the bore has a larger diameter at the stepped portions 16 than at a main section of the bore where the contact elements 24, 25 of the load cell bear against the bore surface 15. Similarly, the first end cap 33 and the second end cap 34 comprise a recessed portion 39, such that the recessed portions 39 have a smaller outside diameter than a main outside diameter of the housing 30. The first resilient O-Ring 37 and the resilient second O-ring 38 are respectively arranged between the recessed portion 39 in the first end cap 33 and the second end cap 34 and the stepped portion 16 at either axial end of the roller bore.

The resilient O-rings 37, 38 seal off the roller bore from the environment, i.e. protect the electrical and electronic components of the sensor unit from exposure to moisture and lubricant. In addition, the resilient O-rings 37, 38 take up deformations of the roller bore, thereby preventing the housing 30 from making contact with the bore. They also ensure that the sensor unit 17 does not rotate at a fast speed inside the roller bore. The frictional contact allows a small amount of creep, which as mentioned above has a negligible effect on the measured bending of the beams 21, 22.

Figure 6:
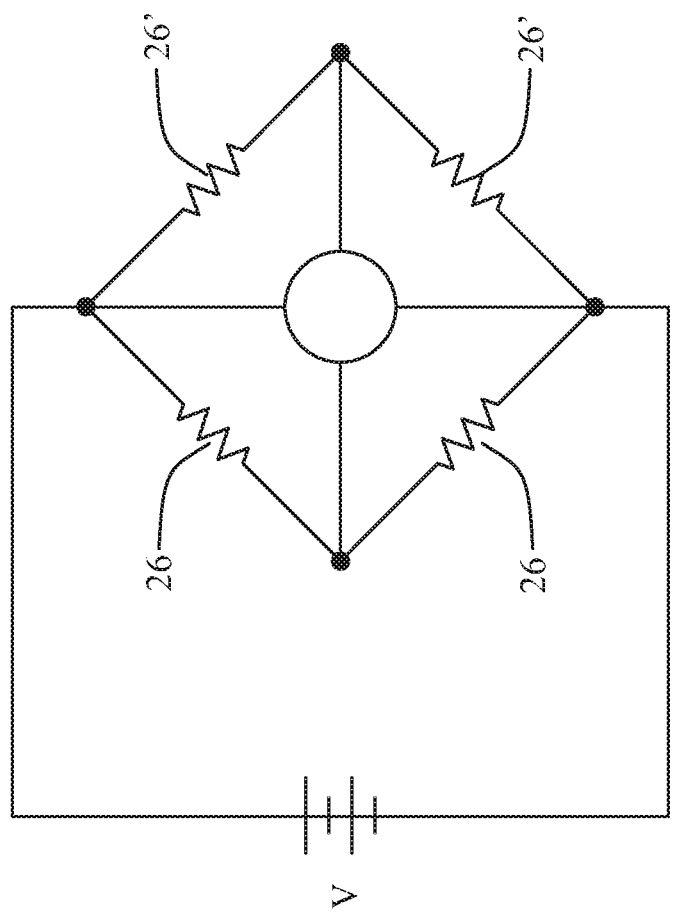
FIG. 6 shows an exemplary wheatstone bridge arrangement.

The cantilever beams 21, 22 may comprise a piezoelectric bending element for measuring the bending stresses. Preferably, each cantilever beam 21, 22 is instrumented with at least one strain gauge 26, 26'. In one example, shown in FIG. 3, strain gauges 26 on beam 21 and a strain gauge on an opposite side of beam 21 (not shown but mounted like strain gauge 26 on beam 22) where opposite sides of the beam experience compression and tension under bending. In another embodiment where the beam has a geometry that causes at least a portion of the beam to experience both tension and compression on one side of the beam, due to radial deflection, a first strain gauge 26 and a second strain gauge 26' are axially spaced along the beam portion in a axial direction 21'. The strain gauges may be connected in half-bridge configuration or half of a wheatstone bridge configuration or half of the configuration (an upper portion or a lower portion of a wheatstone bridge shown in FIG. 6. When the load cell comprises at least two cantilever beams 21, 22, each of which is instrumented with two strain gauges 26, 26', the four strain gauges 26, 26' are preferably connected in a full Wheatstone bridge configuration, as shown in FIG. 6, to provide temperature compensation.

Strain gauge 26 of beam 21 and strain gauge 26' of beam 21 are axially spaced in a axial direction 21' and are provided on one side of the cantilever beam. Strain gauge 26" of beam 22 is located on an opposite of strain gauge 26 of beam 22. A strain gauge similar to strain gauge 26 of beam 21 would be located on an outer side of beam 22 and would not be visible in the illustration presented in FIG. 5. Similarly, a strain gauge can be placed on a convex curve of beams 21, 22, where the strain gauge would be on the same side of the beam 22 as strain gauge 26 of beam 22.

The invention claimed is:

1. A roller for a roller bearing, comprising:
a hollow bore in which a load cell is arranged, wherein the load cell is mounted to the roller bore and provides one or more cantilever beams that extend in an axial direction (z) of the roller,
a contact element is provided on each cantilever beam, the contact element bears against a surface of the roller bore; and
at least one sensor is provided on each cantilever beam for measuring bending thereof, due to deflection of the beam in a radial direction (r) perpendicular to the axial direction (z).

2. The roller according to claim 1, wherein the contact element has a contact surface that is curved in axial direction (z) and in circumferential direction (θ) of the roller.

3. The roller according to claim 2, wherein the roller has a cylindrical bore with a bore radius $r_b$; the contact surface has a radius of curvature $r_c$ and wherein $r_c=(0.8-1.0)r_c$.

4. The roller according to claim 1, wherein each cantilever beam comprises a first section that extends in axial direction (z) away from a fixed end of the beam and further comprises a second section that extends in axial direction back towards the fixed end.

5. The roller according to claim 4, wherein the contact element is provided on the second section.

6. The roller according to claim 1, wherein the load cell comprises first and second cantilever beams and wherein the first cantilever beam has a first contact element that bears against the roller bore surface at a first location and the second cantilever beam has a second contact element that bears against the roller bore surface at a second location, diametrically opposite from the first location.

7. The roller according to claim 1, wherein the load cell forms part of a sensor unit that is inserted into the roller bore, the sensor unit having a housing to which the load cell is attached, the housing having a smaller diameter than the roller bore diameter and is configured such that only the contact element of each cantilever beam is in contact with the bore surface.

8. The roller according to claim 7, wherein the sensor unit is resiliently mounted to the roller bore by means of first and second elastomeric sealing elements arranged at either axial end of the roller bore.

9. The roller according to claim 1, wherein each cantilever beam is provided with a first strain gauge on a portion of the beam that experiences tension under the bending and is further provided with a second strain gauge on a portion of the beam that experiences compression.

10. The roller according to claim 9, wherein the first and second strain gauges are radially spaced and are provided on opposite sides of the cantilever beam.

11. The roller according to claim 9, wherein the first and second strain gauges are axially spaced and are provided on one side of the cantilever beam.

12. The roller according to claim 1, wherein the load cell comprises four strain gauges connected in a Wheatstone bridge.

13. A bearing comprising:
a roller having a hollow bore into which a load cell is arranged, wherein
the load cell is mounted to the roller bore and provides one or more cantilever beams that extend in an axial direction (z) of the roller,
a contact element is provided on each cantilever beam, the contact element bears against a surface of the roller bore; and
at least one sensor is provided on each cantilever beam for measuring bending thereof, due to deflection of the beam in a radial direction (r) perpendicular to the axial direction (z).

* * * * *